US008228909B2

(12) United States Patent
Park

(10) Patent No.: US 8,228,909 B2
(45) Date of Patent: Jul. 24, 2012

(54) METHOD OF COMPRESSING AND RESTORING IP PACKETS TRANSMITTED THROUGH BROADCAST NETWORK

(75) Inventor: Sung-il Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 569 days.

(21) Appl. No.: 12/051,137

(22) Filed: Mar. 19, 2008

(65) Prior Publication Data

US 2009/0034528 A1 Feb. 5, 2009

(30) Foreign Application Priority Data

Aug. 3, 2007 (KR) .................. 10-2007-0078186

(51) Int. Cl.
*H04L 12/28* (2006.01)
(52) U.S. Cl. ........................ 370/389; 370/392
(58) Field of Classification Search .................. None
See application file for complete search history.

(56) References Cited

U.S. PATENT DOCUMENTS

| 6,032,197 | A  | * | 2/2000 | Birdwell et al. ............... 709/247 |
| 6,317,433 | B1 | * | 11/2001 | Galand et al. ............... 370/395.2 |
| 6,618,397 | B1 | * | 9/2003 | Huang ............... 370/474 |
| 6,711,164 | B1 | * | 3/2004 | Le et al. ............... 370/392 |
| 2004/0022252 | A1 | * | 2/2004 | Jang et al. ............... 370/395.52 |
| 2005/0021491 | A1 |  | 1/2005 | Horgan |
| 2005/0025157 | A1 | * | 2/2005 | Pennec et al. ............... 370/395.5 |
| 2005/0041660 | A1 | * | 2/2005 | Pennec et al. ............... 370/389 |
| 2005/0160184 | A1 | * | 7/2005 | Walsh et al. ............... 709/247 |

* cited by examiner

*Primary Examiner* — Chirag G Shah
*Assistant Examiner* — Jenkey Van
(74) *Attorney, Agent, or Firm* — Sughrue Mion, PLLC

(57) ABSTRACT

A method of compressing and restoring an Internet Protocol (IP) packet which is transmitted through a broadcast network is provided. According to the method, by using a characteristic of a transmission structure of a broadcast network, that is unlike ordinary packet switching communication networks, a field value that can be removed from a header part of an IP packet is determined. Then, the determined field value is removed from the header, and an IP packet having a header formed with the remaining field values is generated, thereby compressing the header of the IP packet more effectively compared to the header of the conventional static IP packet. In addition, by transmitting a compressed IP packet instead of a static IP packet which is periodically transmitted according to the conventional method, compatibility that the compression method can be used together with conventional compression methods is guaranteed.

23 Claims, 7 Drawing Sheets

| Version | IHL | Type of Service | Total Length | |
|---|---|---|---|---|
| Identification | | | Flags | Fragment Offset |
| Time to Live | | Protocol | Header Checksum | |
| Source Address | | | | |
| Destination Address | | | | |
| Options (optional) | | | | |

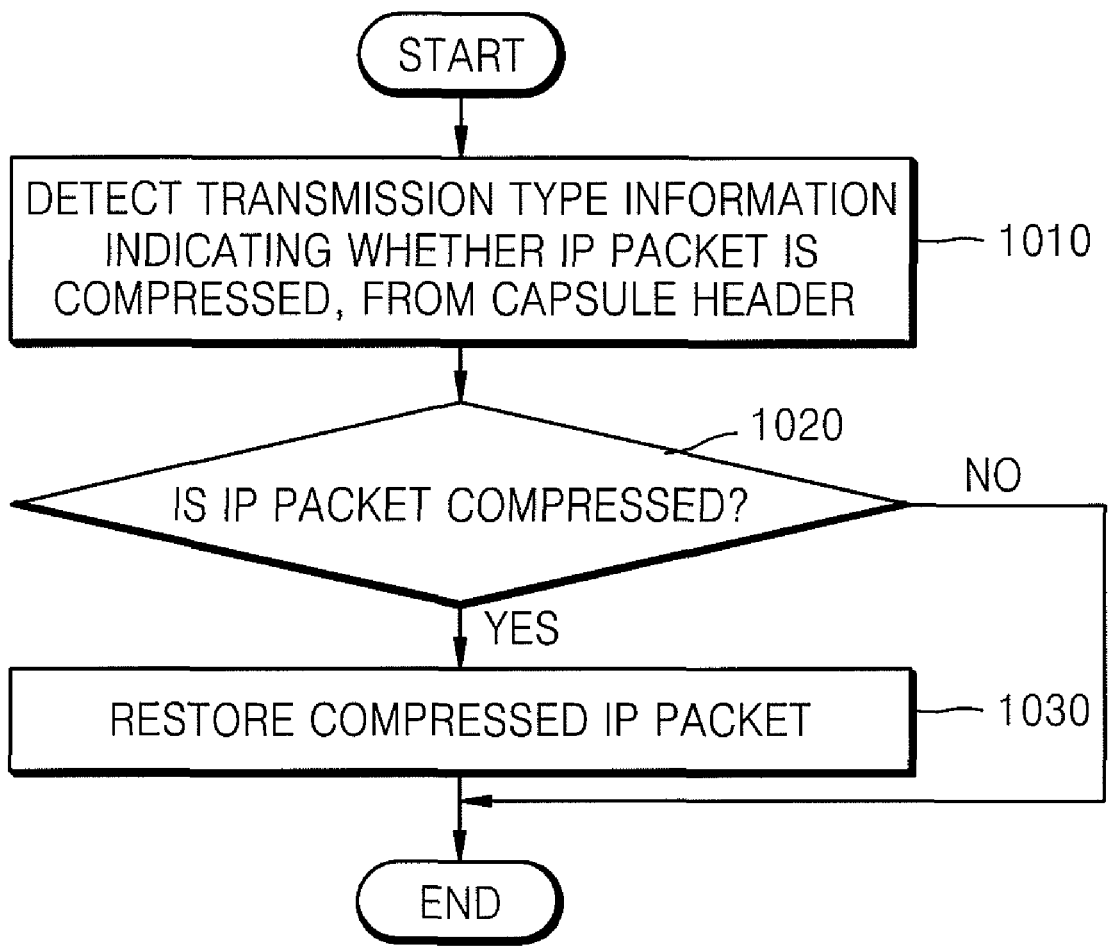

METHOD OF COMPRESSING AND RESTORING IP PACKETS TRANSMITTED THROUGH BROADCAST NETWORK

CROSS-REFERENCE TO RELATED PATENT APPLICATIONS

This application claims priority from Korean Patent Application No. 10-2007-0078186, filed on Aug. 3, 2007, in the Korean Intellectual Property Office, the disclosure of which is incorporated herein in its entirety by reference.

BACKGROUND OF THE INVENTION

1. Field of the Invention

Methods consistent with the present invention relate to compressing and restoring an Internet Protocol (IP) packet which is transmitted through a broadcast network, and more particularly, to compressing an IP packet by using a characteristic of a transmission structure of a broadcast network, that is unlike ordinary packet switching communication networks, by which a field value that can be removed from a header part of an IP packet is determined, the determined field value is removed from the header, and an IP packet having a header formed with the remaining field values is generated, and to restoring the compressed IP packet.

2. Description of the Related Art

FIG. 1 is a schematic diagram illustrating a method of transmitting IP packets through a broadcast network according to conventional technology.

In an ordinary process for broadcasting multimedia content through a broadcast network, first, a content provider generates the multimedia content as a data stream. Then, in order to transmit the data through networks, the data is fragmented into smaller IP packets.

A receiving end receives the plurality of IP packet fragments, multiplexes the packets, and finally broadcasts the packets to unspecified multiple users. Since a broadcast network generally transmits data to multiple users as receivers, data is not exchanged in a state in which a 1:1 or N:1 communication path is established. The broadcast network should also consider users who randomly access broadcast channels.

When data is broadcast in this way, the conventional method compresses an IP packet by using omission of redundant data in the header of the IP packet in order to reduce the size of the IP packet to be transmitted.

Referring to FIG. 1, when time points are expressed as t, t+1, t+2, . . . , t+n, according to the conventional method, a static IP packet which is not compressed is transmitted at time t. An IP packet including a header having a differential value with respect to the previous IP header (at time t) is transmitted at time t+1. However, since unspecified multiple users can access broadcast channels at an arbitrary time while packets are transmitted, a static IP packet having a whole header should be transmitted periodically. Accordingly, an IP packet which is not compressed is transmitted at time t+n as illustrated in FIG. 1.

However, since the static IP packet appearing in the conventional method is not compressed, a method of improving the conventional technology is necessary.

SUMMARY OF THE INVENTION

The present invention provides a method of compressing an IP packet by using a characteristic of a transmission structure of a broadcast network, by which a field value that can be removed from a header part of an IP packet is determined, the determined field value is removed from the header, and an IP packet having a header formed with the remaining field values is generated, and a method of restoring the compressed IP packet.

According to an aspect of the present invention, there is provided a method of compressing an original Internet Protocol (IP) packet which is transmitted through a broadcast network, the method including: determining a field value including a fixed value in a header of the original IP packet by using a characteristic of the broadcast network; removing the determined field value from the header; and generating an IP packet which with a header formed only with the remaining field values, in other words excluding the removed field value.

If the original IP packet is a fragmented IP packet, the method may further include performing preprocessing for restoring the original IP packet to a single IP packet by assembling the fragmented IP packet.

The determining of the field value may be performed by referring to a template having a header of a fixed IP packet.

In the determining of the field value, at least one predefined fixed value among field values included in the header of the original IP packet, a field value that can be calculated from an encapsulation header added to the generated IP packet, and a field value that can be calculated from the header of the generated IP packet may be determined, wherein the generated IP packet is encapsulated according to a transmission structure of the broadcast network.

The at least one predefined fixed value may include at least one among the length of the header (Internet Header Length, IHL), type of service, and time to live (TTL), and the field value that can be calculated from the encapsulation header may be the total length of the generated IP packet, and the field value that can be calculated from the header of the IP packet may be a header checksum.

The header of the generated IP packet may include at least one among an IP version, a protocol, a source address, and a destination address.

In the performing of the preprocessing, if the version of the original IP packet is version 4 (IPv4), converting the original IP packet to version 6 (IPv6) may be further included and if the version of the original IP packet is IPv6, converting the original IP packet to IPv4 may be further included.

The header of the original IP packet may comply with a request for comment 791 (RFC.791) Internet Protocol standard.

The protocol field value in the header of the generated IP packet may be formed as 4 bits.

According to another aspect of the present invention, there is provided a method of compressing an original IP packet and transmitting the compressed IP packet through a broadcast network, the method including: determining a field value that has a fixed value in a header of the original IP packet by using a characteristic of the broadcast network; removing the determined field value from the header; generating an IP packet with a header formed only with the remaining field values, in other words excluding the removed field value; adding an encapsulation header with the generated IP packet as a payload to generate an encapsulation IP packet; and transmitting the encapsulation IP packet.

The adding of the encapsulation header may further include inserting transmission type information indicating whether or not the generated IP packet included in the payload is a compressed packet.

According to another aspect of the present invention, there is provided a method of restoring a compressed IP packet which is transmitted through a broadcast network, the method including: determining a field value removed in the header of the compressed IP packet by using a characteristic of the broadcast network; inserting a field value that has a predefined fixed value to the determined field value; and generating an IP packet by using a header having the inserted field value.

In the determining of the field value, at least one predefined fixed value among field values removed from the header of the compressed IP packet, a field value that can be calculated from an encapsulation header added to the compressed IP packet, and a field value that can be calculated from the header of the generated IP packet may be determined, wherein the compressed IP packet is encapsulated according to a transmission structure of the broadcast network.

The predefined fixed value may include at least one among the length of the header (Internet Header Length, IHL), type of service, and time to live (TTL), and the field value that can be calculated from the encapsulation header may be the total length of the compressed IP packet, and the field value that can be calculated from the header of the generated IP packet may be a header checksum.

The header of the generated IP packet may comply with an RFC.791 Internet protocol standard.

According to another aspect of the present invention, there is provided a method of receiving an encapsulation IP packet which is transmitted through a broadcast network and restoring the IP packet, the method including: detecting from an encapsulation header added to the received encapsulation IP packet, transmission type information indicating whether or not an IP packet included in the payload of the encapsulation IP packet is a compressed packet; if the IP packet included in the payload of the encapsulation IP packet is a compressed IP packet according to the detected transmission type information, determining a field value removed in the header of the compressed IP packet by using a characteristic of the broadcast network; inserting a field value that has a predefined fixed value to the determined field value; and generating an IP packet by using a header having the inserted field value.

According to another aspect of the present invention, there is provided a computer readable recording medium having embodied thereon a computer program for executing the methods.

According to another aspect of the present invention, there is provided a system encoder having a compression apparatus for implementing the methods.

According to the method of compressing and restoring an IP packet which is transmitted through a broadcast network according to the present invention, even a static IP packet which is periodically transmitted according to the conventional technology can be compressed. Compared to the conventional static IP packet which is 20 bytes long, the compressed header of the IP packet according to an exemplary embodiment of the present invention is 9 bytes long, and a compression effect 55% better than that of the conventional technology can be achieved.

In addition, by transmitting a compressed IP packet according to the present invention instead of a static IP packet which is periodically transmitted according to the conventional method, compatibility that the compression method of the present invention can be used together with conventional compression methods is guaranteed.

BRIEF DESCRIPTION OF THE DRAWINGS

The above and other features of the present invention will become more apparent by describing in detail exemplary embodiments thereof with reference to the attached drawings in which:

FIG. 10 is a flowchart illustrating a method of receiving and restoring an encapsulated IP packet which is transmitted through a broadcast network according to an exemplary embodiment of the present invention.

Figure 1:
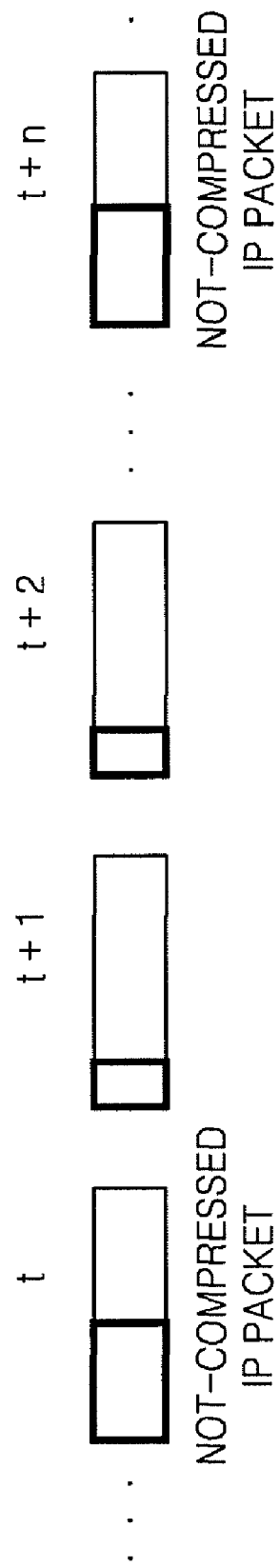
FIG. 1 is a schematic diagram illustrating a method of transmitting IP packets through a broadcast network according to conventional technology.

In the drawings, whenever the same element reappears in subsequent drawings, it is denoted by the same reference numeral. Though the drawings illustrate exemplary embodiments of the present invention, the drawings are not drawn according to a reduced scale, and the thicknesses of layers and regions may be exaggerated for clarity.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings.

Figures 2, 3:
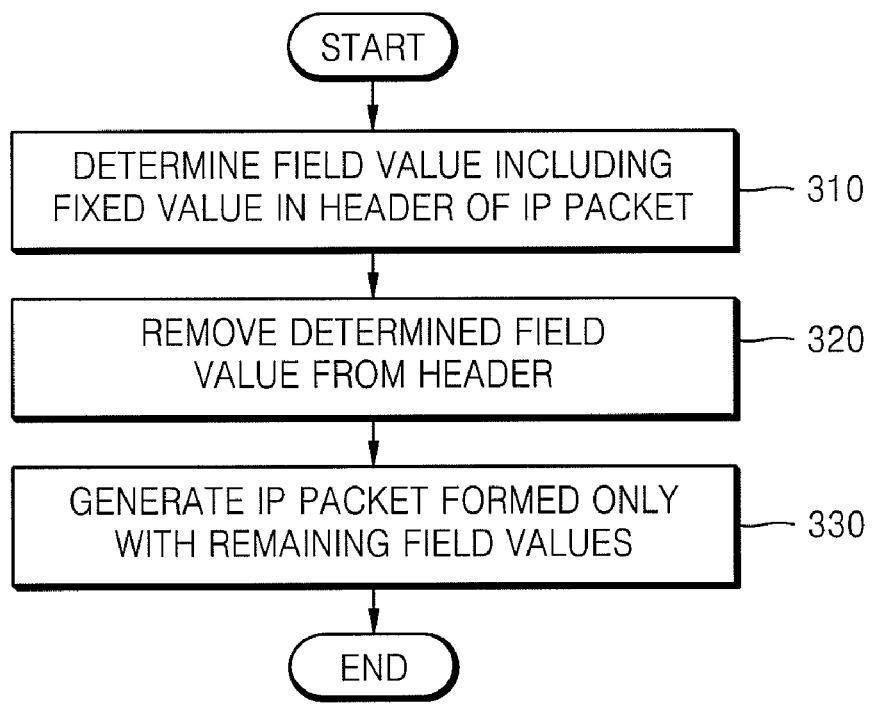
FIG. 2 is a diagram illustrating a data structure of a header format of an RFC. 791 IP packet which is used in an exemplary embodiment of the present invention.
FIG. 3 is a flowchart illustrating a method of compressing an IP packet which is transmitted through a broadcast network according to an exemplary embodiment of the present invention.

FIG. 2 is a diagram illustrating a data structure of a header format of a request for comments 791 (RFC.791) IP packet which is used in an exemplary embodiment of the present invention.

In the exemplary embodiments of the present invention which will be described hereinafter, the RFC.791 protocol will be used. The RFC.791 protocol is a standard recommendation by the Internet Engineering Task Force (IETF), which provides procedures for implementing technologies on the Internet.

Referring to FIG. 2, each field value included in the header of the RFC.791 will now be explained.

(i) Version: IP version information (e.g., IPv4, IPv6), 4 bits (ii) IHL: the length of an Internet header, 4 bits (iii) Type of Service: the type of a service (e.g., low delay, high reliability, best effort), 1 byte (iv) Total Length: the total length of an IP packet, 2 bytes (v) Identification, Flags, Fragment Offset: a packet identifier, a flag, a fragment offset (information for reassembling a fragmented IP packet), 4 bytes (vi) Time to Live (TTL): a hop count that can survive on an IP network, 1 byte (vii) Protocol: a protocol (e.g., UDP, TCP), 1 byte (viii) Header Checksum: a header checksum, 2 bytes (ix) Source Address: an address of a source, 4 bytes (x) Destination Address: an address of a destination, 4 bytes (xi) Options: option information, variable FIG. 3 is a flowchart illustrating a method of compressing an IP packet which is transmitted through a broadcast network according to an exemplary embodiment of the present invention.

Referring to FIG. 3, the method of compressing an IP packet which is transmitted through a broadcast network includes an operation 310 for determining a field value, that has a fixed value, in the header of an IP packet by using a characteristic of the broadcast network, an operation 320 for removing the determined field value, and an operation 330 for generating an IP packet which is formed only with the remaining field values, in other words excluding the removed field value.

The basic idea of this compression method is that IP headers which are transmitted through a broadcast network have almost the same in format ion.

This is because the types of transmitted IP packets are limited due to characteristics of the broadcast network. Accordingly, if a characteristic of the broadcast network and an IP header are analyzed, common IP header information can be determined. If this information is known as standard information by a transmission end and a reception end in advance, that is, if a template having the header of an IP packet is kept, a method of including only the uncommon data in the header of each IP packet can be employed.

According to an exemplary embodiment of the present invention utilizing this principle, a field value that has a fixed value in the header of an IP packet is determined by using a characteristic of a broadcast network in operation 310. In other words, from the characteristic of the broadcast network, a fixed value or a value that can be calculated through inference after the packet is transmitted is determined. Each field value in the IP packet header illustrated in FIG. 2 will now be explained in this regard.

(1) Options: this is a field for adding information in addition to predefined fields in the IP header. Since an option value is generally not used in data transmission through a broadcast network, this can be removed.

(2) IHL: the length of the header is fixed as 20 bytes because the option field is not used. Accordingly, this field does not need to be transmitted, and can be removed.

(3) Type of Service: this is a field for indicating a service type (low delay, high reliability, best effort) for optimizing a transmission method in a transmission network having a limited bandwidth. Accordingly, this field does not have to be used in a broadcast network which has a sufficient bandwidth.

(4) Total Length: this field indicates the total length of an IP packet. The length is a value that can be calculated from an encapsulation header of an encapsulation IP packet which is encapsulated and transmitted according to the transmission structure of a broadcast network. Accordingly, this field does not need to be transmitted, and can be removed.

(5) Identification, Flags, Fragment Offset: because the size of an IP packet that can be processed by an apparatus relaying IP packets in a communication network, such as a router or hub, is limited, these information fields are used in order to divide an IP packet which exceeds the limited size. In order to prevent repetition of a process of fragmenting and reassembling IP packets at each relaying apparatus, these information fields are set in advance as a least permissible value from among the Maximum Transmission Unit (MTU) values of the routers in a relaying path, and are used. However, an operation for broadcasting data through the broadcast network is performed at the end of the path for transmitting data in a communication network to unspecified many persons who are final users. Accordingly, even though a fragmented IP packet is reassembled to one IP packet and transmitted, additional overheads, such as the above-mentioned process of fragmenting and reassembling an IP packet, do not occur in an operation for broadcasting data through the broadcast network. Accordingly, these values can be removed.

(6) Time to Live (TTL): this information indicates a hop count that can survive on an IP network, and is used to prevent an IP packet from being a zombie packet on a network. However, since an IP packet which is transmitted through a broadcast network has only one path, a case in which an IP packet becomes a zombie packet during transmission does not occur. Accordingly, this value does not need to be used, and can be removed.

(7) Header Checksum: this information is to identify integrity of data of the header information of the encapsulated IP packet. In an ordinary encapsulation header for transmitting an IP packet in a broadcast network, information for identifying integrity of a payload is already included, and it can be determined whether or not an IP packet has an error. Accordingly, a receiving end can calculate a header checksum value from the header of an IP packet stored in a received payload. Therefore, this field does not need to be transmitted, and can be removed.

Therefore, as described above, the option value (Options), the length of the header (IHL), the service type (Type of Service), the total length of the IP packet (Total Length), the packet identification, flags, fragment offset (Identification, Flags, Fragment Offset), time to live (TTL), and the header checksum (Header Checksum) are removed from the IP header in operation 320.

Figure 4:
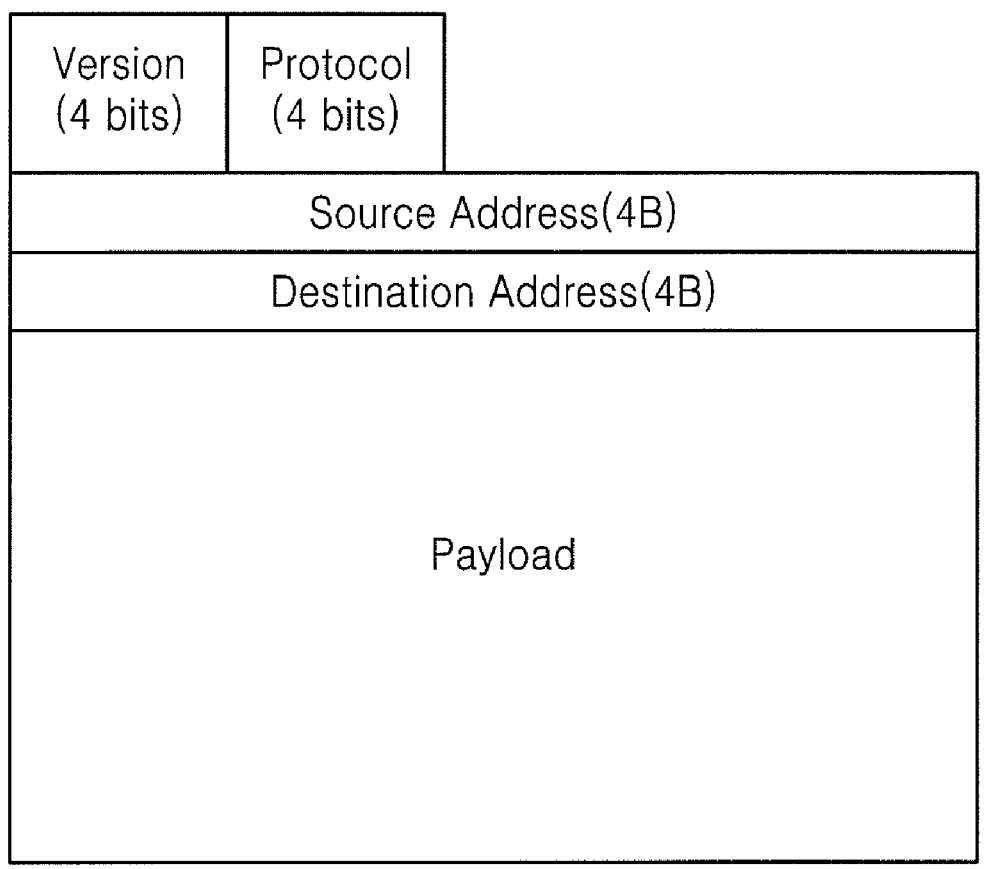
FIG. 4 is a diagram illustrating a data structure of a header shown after performing a method of compressing an IP packet according to an exemplary embodiment of the present invention.

FIG. 4 is a diagram illustrating a data structure of a header shown after performing a method of compressing an IP packet according to an exemplary embodiment of the present invention.

Referring to FIG. 4, the header of the compressed IP packet includes only the IP version, protocol, source address, and destination address.

In addition, since the protocol used for a broadcast network is limited, the field value of the protocol in the generated header of the IP packet can be reconstructed as 4 bits. Each protocol value is reconstructed as 4 bits by collecting only protocol values that are mainly used in a broadcast network from 8-bit contents defined in the RFC.791. This value is determined between a transmission end and a reception end in advance.

Accordingly, considering that the header of the static IP packet, illustrated in FIG. 2, which is a conventional full IP packet, is 20 bytes long, the compressed header of the IP packet according to the present invention, which includes only the IP version information (4 bits), protocol (4 bits), source address (4 bytes), and destination address (4 bytes), is 9 bytes long, a compression effect 55% better than that of the conventional technology can be achieved.

In addition, the compression method according to the present invention can be used together with the conventional compression method in a mixed manner. That is, instead of the static IP packet which is periodically transmitted according to the conventional method, the compressed IP packet according to the present can also be transmitted.

Figure 5:
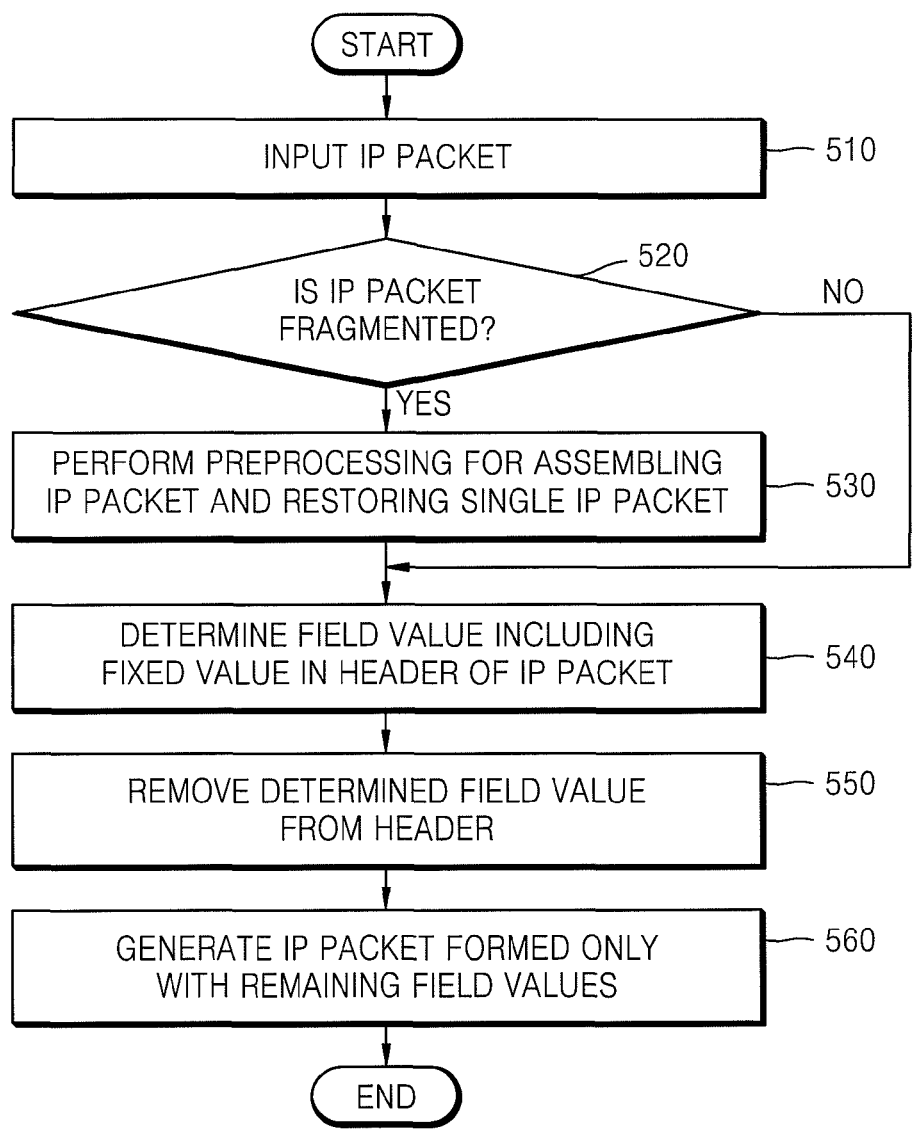
FIG. 5 is a flowchart illustrating a method of compressing an IP packet including a preprocessing process according to an exemplary embodiment of the present invention.

FIG. 5 is a flowchart illustrating a method of compressing an IP packet including a preprocessing process according to an exemplary embodiment of the present invention.

Referring to FIG. 5, an IP packet is first input in operation 510, and it is determined whether or not the input IP packet is fragmented IP packet in operation 520.

If the determination result indicates that the input IP packet is a fragmented one, a preprocessing operation for restoring a single IP packet by assembling the fragmented IP packet is performed in operation 530. Then, as described above, a field value including a fixed value in the header of the IP packet is determined in operation 540, the determined field value is removed from the header of the IP packet in operation 550, and an IP packet which is formed only with the remaining field values, in other words excluding the removed field value, is generated in operation 560.

That is, the process for making a single IP packet of the fragmented IP packets is added before compression of the IP packet, which will now be explained with reference to FIG. 6.

Figure 6:
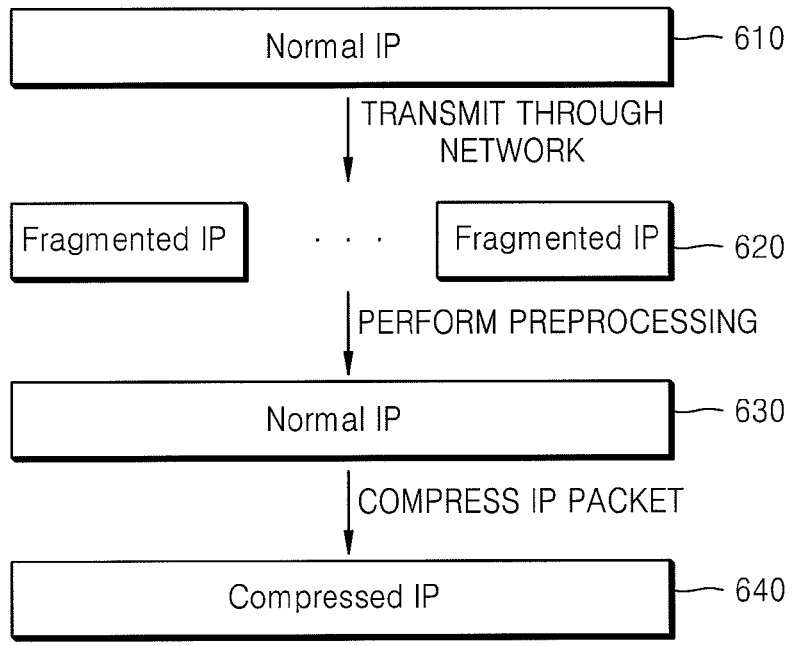
FIG. 6 is a diagram illustrating each operation for processing an IP packet according to an exemplary embodiment of the present invention.

FIG. 6 is a diagram illustrating each operation for processing an IP packet according to an exemplary embodiment of the present invention.

As illustrated in FIG. 6, in operation 620, an original IP packet 610 is fragmented into a plurality of IP packets according to the size limitation (MTU) of a minimum IP packet size that can be processed by an apparatus for relaying an IP packet, such as a router or hub, in a communication network, such as an Ethernet network.

Since the headers of these fragments of the IP packet do not have uniformity, it is necessary to make one IP packet through the preprocessing process according to the present invention so that the header can be the same as a template header.

Accordingly, the fragmented IP packet is restored to a single IP packet in operation 630, and by performing the compression method, described above, for the header of the preprocessed IP packet, a compressed IP packet is finally generated in operation 640.

In addition, when necessary, a process of converting the IP packet from IPv4 to IPv6 when the version of the IP packet is IPv4, or from IPv6 to IPv4 when the version of the IP packet is IPv6 may further be included in the preprocessing process.

Figure 7:
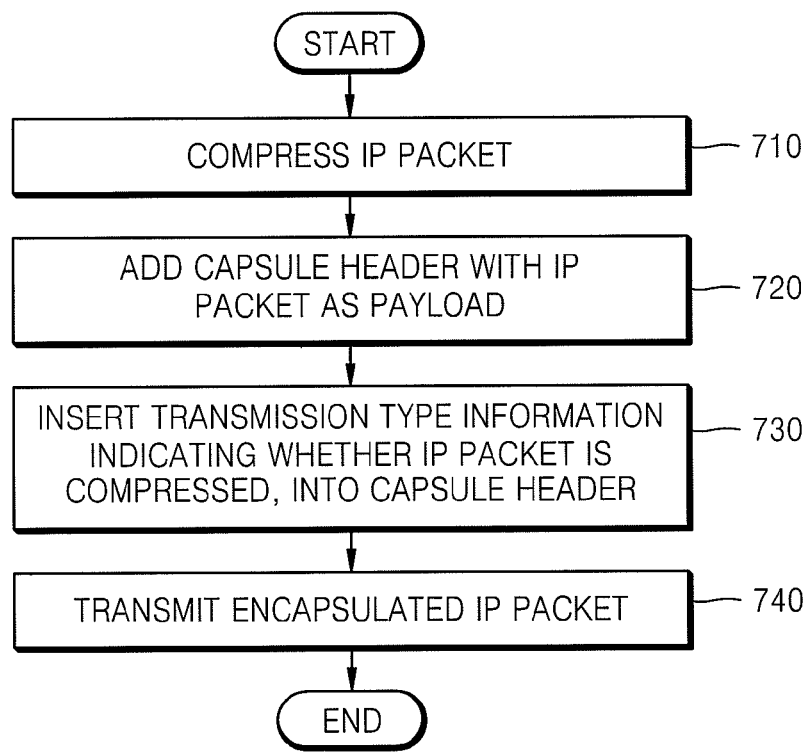
FIG. 7 is a flowchart illustrating a method of compressing and transmitting an IP packet through a broadcast network according to an exemplary embodiment of the present invention.

FIG. 7 is a flowchart illustrating a method of compressing and transmitting an IP packet through a broadcast network according to an exemplary embodiment of the present invention.

Referring to FIG. 7, in addition to the compression method of an IP packet described above, that is, an operation 710 for determining a field value including a fixed value in a header of an IP packet, removing the determined field value, and generating an IP packet which is formed only with the remaining field values, an operation 720 for adding an encapsulation header with the generated IP packet as a payload, and an operation 740 for transmitting an encapsulation IP packet to which the encapsulation header is added are further included.

When the compressed IP packet described above is transmitted through a broadcast network, a separate encapsulation process is performed. In this case, the compressed IP packet becomes payload data to be transmitted and an encapsulation header is added. The encapsulation header may include payload type information and other information such as a CRC value guaranteeing integrity of payload data.

Figure 8:
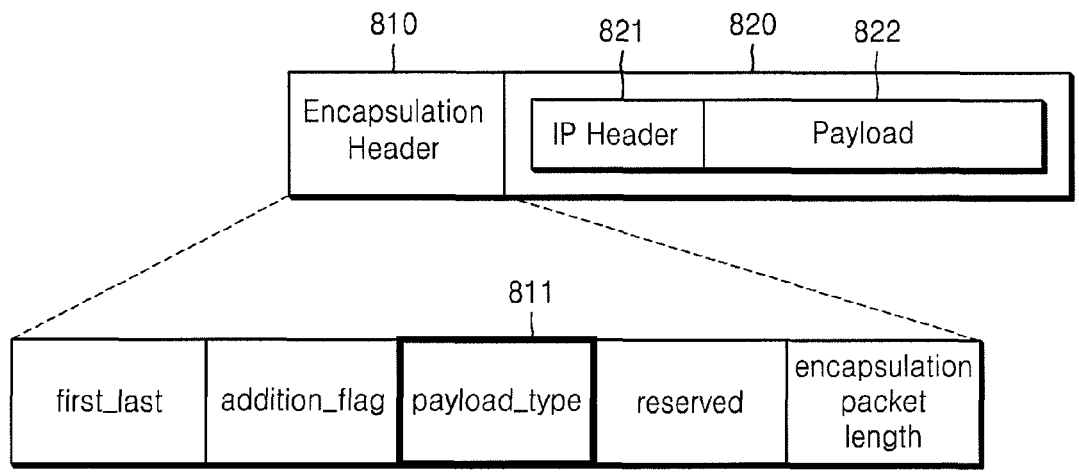
FIG. 8 is a diagram illustrating a data structure of an IP packet encapsulated according to a transmission structure of a broadcast network according to an exemplary embodiment of the present invention.

In order to describe the encapsulation header more specifically, FIG. 8 illustrating a data structure of an IP packet encapsulated according to a transmission structure of a broadcast network according to an exemplary embodiment of the present invention can be referred to.

The encapsulation IP packet is formed with an encapsulation header 810 and a payload 820. The payload includes the IP packet (IP header 821+payload 822) having the IP header 821 compressed according to the compression method described above.

More specifically, the encapsulation header 810 may include transmission type information (payload_type) 811 indicating whether or not an IP packet included in the payload is a compressed packet. That is, when an IP packet is transmitted through a broadcast network, in operation 730 transmission type information (payload_type) indicating whether or not an IP packet included in the payload is a compressed packet is inserted. For example, if the transmission type information is "0x00", it may indicate an ordinary IP packet, and if the transmission type information is "0x01", it may indicate a compressed IP packet of the present invention. This transmission type information value can be expressed in a variety of ways.

Accordingly, the inserted transmission type information is detected in a reception end later, and it can be determined whether or not data included in the payload of the encapsulation IP packet is a compressed IP packet.

Figure 9:
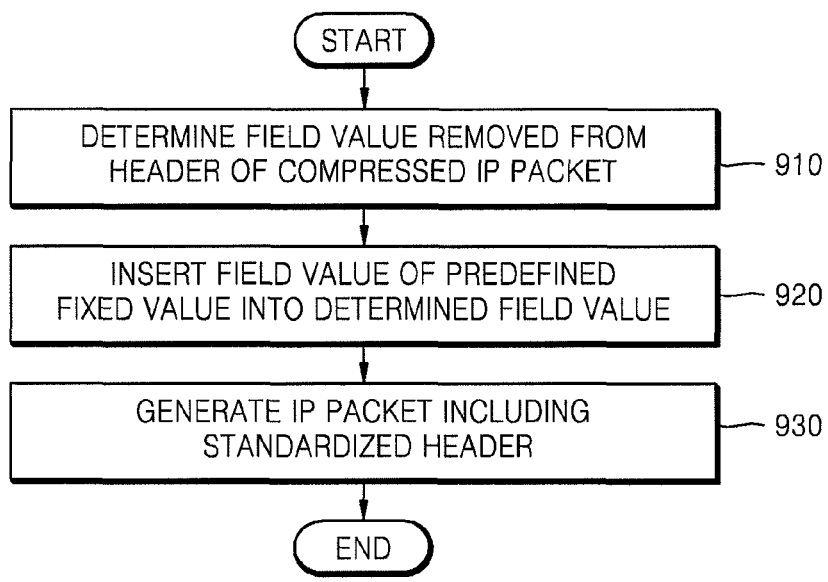
FIG. 9 is a flowchart illustrating a method of restoring a compressed IP packet which is transmitted through a broadcast network according to an exemplary embodiment of the present invention.

FIG. 9 is a flowchart illustrating a method of restoring a compressed IP packet which is transmitted through a broadcast network according to an exemplary embodiment of the present invention.

Referring to FIG. 9, the method of restoring a compressed IP packet according to the current exemplary embodiment includes an operation 910 for determining a field value removed from the header of the compressed IP packet by using a characteristic of a broadcast network, an operation 920 for inserting a field value including a predefined fixed value to the determined field value, and an operation 930 for generating an IP packet by using the header having the inserted field value.

This is performing in reverse order the IP packet compression method, described above. In operation 910 for determining which field values are removed, predefined fixed value or values that can be calculated through inference from the received encapsulation header are determined.

Then, the predefined fixed value or values obtained by calculating through inference from the encapsulation header by extracting required parameters, are inserted into the removed field in operation 920. This can be performed by referring to a template of an IP header which a reception end has in advance, as standard information.

For example, in the case of the IHL, the length of an IP header is fixed as 20 bytes, and therefore the fixed value is inserted. In the case of Type of Service, a predefined fixed value (for example, "High Reliability") can be inserted. In the case of "Total Length", it indicates the total length of the IP packet, and can be calculated as the length value of the payload excluding the length of the encapsulation header. In the case of Identification, Flags, Fragment Offset, the flag value can be set as "no fragment". In the case of Time to Live (TTL), a fixed value such as "1" can be used.

In the case of Header Checksum, it can be recalculated according to a checksum calculation method defined in the RFC.791 with the header value of the restored IP packet as an input. In the case of "Options", the value is not used, and therefore the field is left as being empty.

Finally, an IP packet having all field values of a standardized header is generated in operation 930, and transferred to an apparatus of a reception end in an operation for processing an IP packet.

FIG. 10 is a flowchart illustrating a method of receiving and restoring an encapsulated IP packet which is transmitted through a broadcast network according to an exemplary embodiment of the present invention.

Referring to FIG. 10, an operation 1010 for detecting from an encapsulation header added to a received encapsulation IP packet, transmission type information indicating whether or not an IP packet is a compressed packet is performed.

Then, if the detected transmission type information indicates that the IP packet is a compressed packet in operation 1020, the restoring method described above is performed, including determining a field value removed from the header of the compressed IP packet, inserting a field value including a predefined fixed value to the determined field value, and generating an IP packet by using the header having the inserted field value.

As described above, since the transmission type information (payload_type) indicating whether or not an IP packet included in the payload is a compressed packet is included in the encapsulation header, when the detected transmission type information indicates a compressed IP packet and not an ordinary IP packet, for example, the restoring process of the current exemplary embodiment is performed in operation 1030.

This transmission type information can also be known through program specific information (PSI) such as a program map table (PMT) or a program association table (PAT) in a transport stream (TS) of an MPEG-2 system.

It can also be known by using a packet identifier (PID).

As described above, the exemplary embodiments of the present invention can be easily applied and implemented in a variety of broadcast transmission systems using IP packets, such as digital video broadcasting-handheld (DVB-H) and media forward link only (Media-FLO).

The present invention can also be embodied as computer readable code on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of compressing, at a transmission end, an original Internet Protocol (IP) packet which is transmitted as broadcasting data through a broadcast network where an end of a path transmits data through a communication network to unspecified end users, the method comprising:

determining field values including at least one fixed value and at least one value that is calculated through inference after a compressed IP packet is transmitted through the broadcast network in a header of the original IP packet by using a characteristic of the broadcast network;

removing the determined field values from the header; and generating an IP packet with a header formed only with the remaining field values, wherein the determining of the field values is performed by referring to a template having a header of a fixed IP packet, and the template is created prior to handling any broadcasting data at the transmission end, and the template is stored at the transmission end prior to handling any broadcasting data at the transmission end, wherein in the determining of the field values, at least one predefined fixed value among field values included in the header of the original IP packet, a field value that is determined from an encapsulation header added to the generated IP packet, and a field value that is calculated from the header of the generated IP packet are determined, and wherein the generated IP packet is encapsulated according to a transmission structure of the broadcast network.

2. The method of claim 1, further comprising:

performing preprocessing, to restore the original IP packet to a single IP packet, if the original IP packet is a fragmented IP packet, by assembling the fragmented IP packet.

3. The method of claim 2, wherein in the performing of the preprocessing, if the version of the original IP packet is version 4 (IPv4), converting the original IP packet to version 6 (IPv6), and if the version of the original IP packet is IPv6, converting the original IP packet to IPv4.

4. The method of claim 3, wherein the header of the original IP packet complies with a Request For Comment 791 (RFC.791) Internet Protocol standard.

5. The method of claim 4, wherein a protocol field value in the header of the generated IP packet is 4 bits.

6. The method of claim 1, wherein the at least one predefined fixed value includes at least one among the length of the header (Internet Header Length, IHL), type of service, and Time to Live (TTL), and the field value that is determined from the encapsulation header is the total length of the generated IP packet, and the field value that is calculated from the header of the generated IP packet is a header checksum.

7. The method of claim 6, wherein the header of the generated IP packet includes at least one among an IP version, a protocol, a source address, and a destination address.

8. The method of claim 6, wherein the total length of the generated IP packet is determined only from the encapsulation header of the generated IP packet, and the header checksum of the generated IP packet is calculated only from the header of the generated IP packet.

9. The method of claim 1, wherein all IP packets of the broadcasting data are compressed and transmitted through the communication network to the unspecified end users.

10. The method of claim 1, wherein the field value that is determined from the encapsulation header is determined only from the encapsulation header of the generated IP packet, and the field value that is calculated from the header of the generated IP packet is calculated only from the header of the generated IP packet.

11. A method of compressing, at a transmission end, an original IP packet and transmitting the compressed IP packet as broadcasting data through a broadcast network where an end of a path transmits data through a communication network to unspecified end users, the method comprising:

determining field values including at least one fixed value and at least one value that is calculated through inference after a compressed IP packet is transmitted through the broadcast network in a header of the original IP packet by using a characteristic of the broadcast network;

removing the determined field values from the header;

generating an IP packet with a header formed only with the remaining field values;

adding an encapsulation header with the generated IP packet as a payload to generate an encapsulation IP packet; and transmitting the encapsulation IP packet, wherein the determining of the field values is performed by referring to a template having a header of a fixed IP packet, and the template is created prior to handling any broadcasting data at the transmission end, and the template is stored at the transmission end prior to handling any broadcasting data at the transmission end, wherein in the determining of the field values, at least one predefined fixed value among field values included in the header of the original IP packet, a field value that is determined from an encapsulation header added to the generated IP packet, and a field value that is calculated from the header of the generated IP packet are determined, and wherein the generated IP packet is encapsulated according to a transmission structure of the broadcast network.

12. The method of claim 11, wherein the adding of the encapsulation header further comprises inserting transmission type information indicating whether or not the generated IP packet included in the payload is a compressed packet.

13. The method of claim 11, wherein all IP packets of the broadcasting data are compressed and transmitted through the communication network to the unspecified end users.

14. A method of restoring, at a receiving end, a compressed IP packet which is transmitted as broadcasting data through a broadcast network where an end of a path transmits data through a communication network to unspecified end users, the method comprising:

determining field values removed in the header of the compressed IP packet by using a characteristic of the broadcast network;

inserting field values including at least one predefined fixed value and at least one value that is calculated through inference after the compressed IP packet is transmitted through the broadcast network into the determined field values of the header of the compressed IP packet; and generating an IP packet by using a header having the inserted field values, wherein the determining of the field values is performed by referring to a template having a header of a fixed IP packet, and the template is stored at the receiving end prior to receiving any transmission of the broadcasting data, wherein in the determining of the field values, at least one predefined fixed value among field values removed from the header of the compressed IP packet, a field value that is determined from an encapsulation header added to the compressed IP packet, and a field value that is calculated from the header of the generated IP packet are determined, and wherein the compressed IP packet is encapsulated according to a transmission structure of the broadcast network.

15. The method of claim 14, wherein the at least one predefined fixed value includes at least one among the length of the header (Internet Header Length, IHL), type of service, and Time to Live (TTL), and the field value that can be determined from the encapsulation header is the total length of the compressed IP packet, and the field value that can be calculated from the header of the generated IP packet is a header checksum.

16. The method of claim 15, wherein the header of the generated IP packet complies with an RFC.791 Internet protocol standard.

17. The method of claim 15, wherein the total length of the generated IP packet is determined only from the encapsulation header of the generated IP packet, and the header checksum of the generated IP packet is calculated only from the header of the generated IP packet.

18. The method of claim 14, wherein all IP packets of the broadcasting data received at the receiving end of the unspecified users are restored.

19. The method of claim 14, wherein the field value that is determined from the encapsulation header is determined only from the encapsulation header of the generated IP packet, and the field value that is calculated from the header of the generated IP packet is calculated only from the header of the generated IP packet.

20. A method of receiving, at a receiving end, an encapsulation IP packet which is transmitted as broadcasting data through a broadcast network where an end of a path transmits data through a communication network to unspecified end users and restoring the IP packet, the method comprising:

detecting from an encapsulation header added to the received encapsulation IP packet, transmission type information indicating whether or not an IP packet included in the payload of the encapsulation IP packet is a compressed packet;

if the IP packet included in the payload of the encapsulation IP packet is a compressed IP packet according to the detected transmission type information, determining field values removed in the header of the compressed IP packet by using a characteristic of the broadcast network;

inserting field values including at least one predefined fixed value and at least one value that is calculated through inference after the compressed IP packet is transmitted through the broadcast network into the determined field values of the header of the compressed IP packet; and generating an IP packet by using a header having the inserted field values, wherein the determining of the field values is performed by referring to a template having a header of a fixed IP packet, and the template is stored at the receiving end prior to receiving any transmission of the broadcasting data, wherein in the determining of the field values, at least one predefined fixed value among field values removed from the header of the compressed IP packet, a field value that is determined from an encapsulation header added to the compressed IP packet, and a field value that is calculated from the header of the generated IP packet are determined, and wherein the compressed IP packet is encapsulated according to a transmission structure of the broadcast network.

21. The method of claim 20, wherein all IP packets of the broadcasting data received at the receiving end of the unspecified users are compressed IP packets.

22. A non-transitory computer readable recording medium having embodied thereon a computer program for executing a method of compressing an original Internet Protocol (IP) packet which is transmitted as broadcasting data through a broadcast network where an end of a path transmits data through a communication network to unspecified end users, the method comprising:

determining field values including at least one fixed value and at least one value that is calculated through inference after a compressed IP packet is transmitted through the broadcast network in a header of the original IP packet by using a characteristic of the broadcast network;

removing the determined field values from the header; and generating an IP packet with a header formed only with the remaining field values, wherein the determining of the field values is performed by referring to a template having a header of a fixed IP packet, and the template is created prior to handling any broadcasting data at the transmission end, and the template is stored at the transmission end prior to handling any broadcasting data at the transmission end, wherein in the determining of the field values, at least one predefined fixed value among field values included in the header of the original IP packet, a field value that is determined from an encapsulation header added to the generated IP packet, and a field value that is calculated from the header of the generated IP packet are determined, and wherein the generated IP packet is encapsulated according to a transmission structure of the broadcast network.

23. The computer readable recording medium of claim 22, wherein all IP packets of the broadcasting data are compressed and transmitted through the communication network to the unspecified end users.

* * * * *